(12) United States Patent
Hell

(10) Patent No.: US 12,716,829 B2
(45) Date of Patent: Aug. 25, 2026

(54) METHOD FOR MAPPING THE SURFACE OF A MACROMOLECULE

(71) Applicant: Max-Planck-Gesellschaft zur Förderung der Wissenschaften e.V., Berlin (DE)

(72) Inventor: Stefan W. Hell, Göttingen (DE)

(73) Assignee: Max-Planck-Gesellschaft zur Förderung der Wissenschaften e.V., Berlin (DE)

( * ) Notice: Subject to any disclaimer, the term of this patent is extended or adjusted under 35 U.S.C. 154(b) by 134 days.

(21) Appl. No.: 18/913,564

(22) Filed: Oct. 11, 2024

(65) Prior Publication Data

US 2025/0035536 A1 Jan. 30, 2025

Related U.S. Application Data

(63) Continuation of application No. PCT/EP2023/058765, filed on Apr. 4, 2023.

(30) Foreign Application Priority Data

Apr. 13, 2022 (DE) ..................... 10 2022 109 027.2

(51) Int. Cl.
*G01N 15/14* (2024.01)
*G01N 15/1429* (2024.01)
(Continued)

(52) U.S. Cl.
CPC ..... *G01N 15/1468* (2013.01); *G01N 15/1429* (2013.01); *G01N 15/1434* (2013.01); *G01N 2015/1497* (2013.01)

(58) Field of Classification Search
CPC ...... G01N 21/64; G01N 21/17; G01N 21/658; G01N 15/1468; G01N 15/1429;
(Continued)

(56) References Cited

U.S. PATENT DOCUMENTS 8,599,388 B1 * 12/2013 van Dijk ............ G01N 21/6428 356/302
9,291,562 B2 3/2016 Hell
(Continued)

FOREIGN PATENT DOCUMENTS

CN 112485232 A 3/2021
CN 111879234 B 11/2021
(Continued)

OTHER PUBLICATIONS

Weber, Michael et al: "Minsted fluorescence localization and nanoscopy," Nature Photonics, Mar. 15, 2021, pp. 361-366, vol. 15, No. 5, Nature Publishing Group, London, UK.
(Continued)

*Primary Examiner* — Courtney D Thomas
(74) *Attorney, Agent, or Firm* — Thomas | Horstemeyer, LLP

(57) ABSTRACT

In order to map the surface of a macromolecule, at least one fluorescent probe is introduced into a medium in which the macromolecule is embedded or will be embedded. Then, a plurality of spatial positions of the at least one fluorescent probe with regard to the macromolecule are determined via localization of the at least one singularized fluorescent probe with a simple standard deviation of no more than 2 nm. For this purpose, fluorescence light photons emitted by the singularized fluorescent probe are recorded. In addition, a bounding surface bounding the determined spatial positions with regard to the macromolecule is determined; and a three-dimensional map of at least a part of the surface of the macromolecule is generated from the bounding surface.

20 Claims, 10 Drawing Sheets

(51) Int. Cl.
*G01N 15/1434* (2024.01)
*G01N 21/64* (2006.01)

(58) Field of Classification Search
CPC ....... G01N 15/1434; G01N 2015/1497; G01N 21/6428; G06T 17/00; C12Q 1/68; G01B 11/00
See application file for complete search history.

(56) References Cited

U.S. PATENT DOCUMENTS

| | | | |
|---|---|---|---|
| 10,794,829 | B2 | 10/2020 | Hell et al. |
| 10,908,089 | B2 | 2/2021 | Balzarotti et al. |
| 11,255,791 | B2 | 2/2022 | Hell et al. |
| 12,055,728 | B2 | 8/2024 | Schmidt et al. |
| 2022/0057615 | A1 | 2/2022 | Harke et al. |
| 2023/0003651 | A1 | 1/2023 | Harke et al. |
| 2023/0350179 | A1 | 11/2023 | Schmidt |
| 2023/0384223 | A1 | 11/2023 | Harke et al. |
| 2024/0035950 | A1 | 2/2024 | Harke et al. |

FOREIGN PATENT DOCUMENTS

| | | | |
|---|---|---|---|
| DE | 102013101610 | A1 | 8/2014 |
| DE | 102020127320 | B3 | 1/2022 |
| DE | 102020134495 | A1 | 7/2022 |
| DE | 102021000060 | A1 | 7/2022 |
| DE | 102021100564 | A1 | 8/2022 |
| DE | 102021107704 | A1 | 9/2022 |
| EP | 3055674 | B1 | 11/2018 |
| EP | 3523631 | B1 | 1/2021 |
| EP | 3372990 | B1 | 3/2021 |
| EP | 3372989 | B1 | 5/2022 |
| WO | WO2021122407 | A1 | 6/2021 |

OTHER PUBLICATIONS

Gwosch, Klaus C. et al.: "Minflux nanoscopy delivers 3D multicolor nanometer resolution in cells," Nature Methods, Jan. 13, 2020, pp. 217-224, vol. 17, No. 2, Nature Publishing Group, New York, US.

Weber, Michael et al.: "Minsted nanoscopy enters the Angstrom localization range," Mar. 19, 2022, BioRxiv, pp. 1-12, https://www.biorxiv.org/content/10.1101/2022.03.18.484906v1.

English Translation of the International Preliminary Report on Patentability, dated Oct. 24, 2024, from International Application No. PCT/EP2023/058765.

* cited by examiner

METHOD FOR MAPPING THE SURFACE OF A MACROMOLECULE

CROSS REFERENCE TO RELATED APPLICATIONS

This application is a continuation of International Application No. PCT/EP2023/058765 entitled "Method for mapping the surface of a macromolecule" filed on Apr. 4, 2023 and claiming priority to German Patent Application No. DE 10 2022 109 027.2 entitled "Verfahren zum Kartieren der Oberfläche eines Makromolekuls" filed on Apr. 13, 2022, the disclosures of which are hereby incorporated herein by reference in their entirety.

FIELD OF THE INVENTION

The invention relates to a method for mapping the surface of a macromolecule.

In this description and the accompanying claims, the macromolecule may be, but does not need to be understood as a protein or a protein complex. The surface of interest is an essential part of the so-called tertiary structure of proteins and the so-called quaternary structure of complexes. The primary goal of mapping the surface is the determination of its three-dimensional course. The determination of the position of areas of special chemical and/or physical properties adds to that. All at all, it may be the goal to recognize and characterize binding sites for other molecules or macromolecules at the surface of the macromolecule.

BACKGROUND OF THE INVENTION

A known method for determining the structure of macromolecules is X-ray structural analysis. This method requires the production of crystals of the macromolecules. Thus, it is not sufficient that a plurality of the macromolecules is present, but these macromolecules have also to be arranged in a crystal lattice. Unfortunately, many macromolecules cannot be crystallized, or the production of crystals consumes much time and money. Even if the crystallization is successful, there is the danger that the structure of the macromolecule is altered by the crystallization. Further, although information on the tertiary structure of proteins or the quaternary structure of complexes are obtained by X-ray structural analysis, a complete mapping of their surfaces is not possible, as a rule.

Further, it is known to determine structures of macromolecules by means of nuclear magnetic resonance spectroscopy (MNR-spectroscopy). For this purpose, no crystals of the macromolecule are needed. However, only information on the surroundings of the nuclei of individual chemical elements in the macromolecules are obtained but no direct data of the course of the surface of the macromolecules. Further, the expenses are also very high here.

The structure of proteins may also be determined by means of cryo-electron microscopy (cryo-EM). In this method, a high number of images are recorded from electrons that are scattered at the plurality of individual proteins or protein complexes, and the images are averaged by means of computer algorithms such that the structure becomes evident. In order to achieve the desired structure, this method requires high-resolution electron microscopy and preparation of the sample at low temperatures. Further, this method is very expensive, laborious and not compatible with the physiological surrounding conditions of the proteins. In addition to that, no physical and chemical properties of the surface of the macromolecules or complexes to be investigated can be determined directly.

Further, it is known to predict the tertiary structure of proteins by means of artificial intelligence on the basis of their primary structure, i.e. their amino acid sequence and of structural information which is available for other macromolecules with known amino acid sequence. Such a prediction on the basis of artificial intelligence is, for example, made by the computer program AlphaFold of the company GOOGLE. At least up to now, the predicted tertiary structures are afflicted with large errors. The tertiary structure is not determined directly, but just estimated based on a plausibility consideration.

Further, none of these known methods is suitable for mapping the surface of a protein directly within a living cell. The information provided by the known methods only indirectly relates to the surface of interest of the macromolecules. Directly, the information is related to the atomic structure of the macromolecules which, alone, does not allow for a conclusion on the actual binding ability of the macromolecules in their native surroundings.

There is a need of a method for mapping the surface of a macromolecule which eliminates the drawbacks mentioned.

A method of imaging a sample in which a fluorescent particle in the sample is arranged in a spatially limited minimum of a light intensity distribution of fluorescence excitation light, and movements of the particle in the sample are tracked with the minimum of the light intensity distribution is known from European patent EP 3 055 674 B1 and U.S. Pat. No. 9,291,562 belonging to the same patent family. For the tracking, the light intensity distribution in the sample is moved such that a rate of fluorescence light photons emitted by the particle remains minimal. The present position of the minimum of the light intensity distribution in the sample is equated with the present position of the particle in the sample. From this, a dwell time of the particle is determined for each of a plurality of areas of the sample, and a distribution of the dwell times over the sample is imaged. This method may be carried out with different fluorescent particles which can be excited for fluorescence with fluorescence excitation light of different wavelengths. The known method can also be executed for each of a plurality of fluorescent particles with equal or different wavelengths of the fluorescence excitation light. Further, photoactivatable fluorophores may be used as the fluorescent particles.

A method of spatially measuring a nanoscale structure is known from European patent EP 3 372 989 B1 and U.S. Pat. No. 11,255,791 belonging to the same patent family. The structure is marked with fluorescent markers at different positions. In a local minimum of an intensity distribution of fluorescence inhibiting light, the fluorescence markers are excited for emission fluorescence light by means of excitation light. In doing so, the local minimum is arranged at different positions in a close range within the sample, whose dimensions are no larger than the diffraction barrier at the wavelength of the excitation light and the wavelength of the fluorescence light. The fluorescence light emitted out of the sample is separately registered for the individual fluorescence markers and for the different positions of the minimum; and the positions of the individual fluorescence markers in the sample are determined from the intensity of the fluorescence light registered for the respective fluorescence marker for the various positions of the minimum.

Methods for spatially high-resolution determining the position of a singularized molecule excitable for emission of luminescence light by means of excitation light in a sample, which are also designated as MinFlux, are known from European patent EP 3 523 631 B1 and U.S. Pat. No. 10,908,089 belonging to the same patent family. The excitation light is directed onto the sample with an intensity distribution having a local minimum. The minimum is arranged at different positions close to the molecule. The position of the molecule in the sample is determined from the intensities of the luminescence light from the molecule registered in the process. With these known methods, the position of the molecule in the sample can be determined at a precision in the range between 0.5 and 20 nm. The known methods may be used to track a molecule moving in the sample, i.e. to temporary follow its position.

A method called MinSTED in which the position of a singularized fluorescent molecule is determined by means of superimposed intensity distributions of fluorescence excitation light and fluorescence inhibition light, as they are known from STED scanning fluorescence microscopy, is known from M. Weber et al., "MINSTED nanoscopy enters the Angstrom localization range", https://www.biorxiv.org/content/10.1101/2022.03.18.484906v1. However, the sample is not scanned with the zero point of the fluorescence inhibition light and the focus of the fluorescence excitation light superimposed thereto, but the zero point is arranged at individual, fast changing positions in the surroundings of the molecule to be localized. On the basis of 2,000 fluorescence photons registered in the process, the position of the fluorescent molecule can be determined at a precision whose single standard deviation is smaller than 0.5 nm.

SUMMARY OF THE INVENTION

The present invention relates to a method for mapping the surface of a macromolecule. The method comprises the steps of introducing at least one fluorescent probe into a medium in which the macromolecule is embedded or will be embedded; and determining a plurality of spatial positions of the at least one fluorescent probe with regard to the macromolecule by localization of the at least one singularized fluorescent probe at a single standard deviation of not more than 2 nm. In this step of determining, fluorescence light photons emitted by the singularized fluorescent probe are registered. The method further comprises the steps of determining a bounding surface bounding the determined spatial positions with regard to the macromolecule; and generating a three-dimensional map of at least a part of the surface of the macromolecule from the bounding surface.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
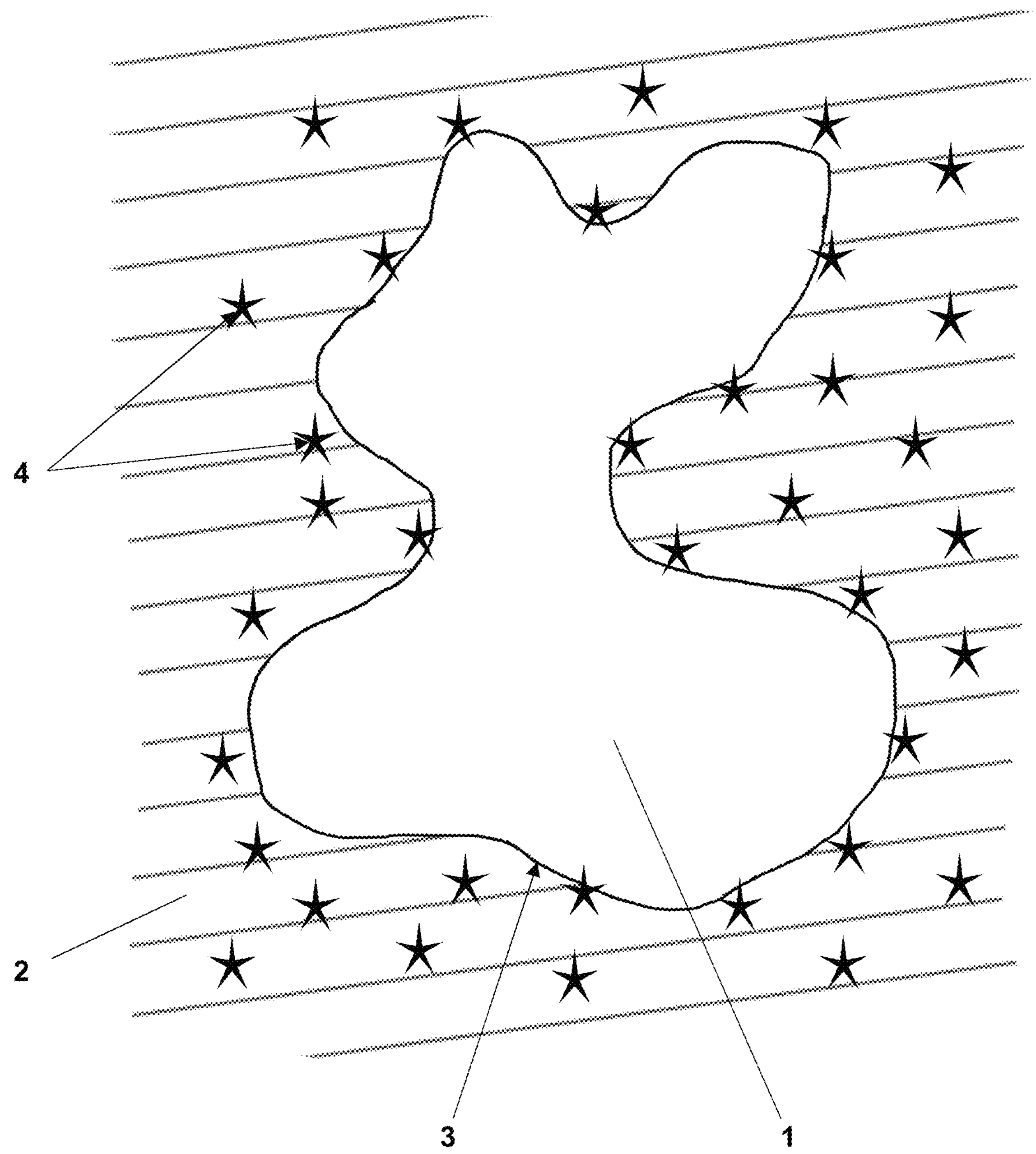
FIG. 1 schematically shows a first macromolecule embedded in a medium, wherein fluorescent probes are introduced in the medium.

For mapping the surface of a macromolecule according to the present disclosure, at least one fluorescent probe is introduced in a medium in which the macromolecule is already embedded or into which the macromolecule is embedded together with the at least one fluorescent probe or even later. A plurality of spatial positions of the at least one fluorescent probe with regard to the macromolecule are determined by localization of the singularized at least one fluorescent probe at a single standard deviation, i.e. at one standard deviation, of not more than 2 nm, wherein fluorescence light photons emitted by the singularized fluorescent probe are registered. Then, a bounding surface bounding the determined spatial positions with regard to the macromolecule is determined. A three-dimensional map of at least part of the surface of the macromolecule is generated from this bounding surface.

The method according to the present disclosure may use the natural surroundings of the macromolecule, for example within a cell, even within a living cell, as the medium in which the macromolecule is embedded. Alternatively, the medium is a medium in which the macromolecule is embedded especially for executing the method according to the present disclosure. In any case, at least one fluorescent probe is introduced in medium. The at least one fluorescent probe is to be understood as a single fluorescent unit. As a rule, several such fluorescent units are simultaneously or one after the other introduced in the medium, because a plurality of spatial positions of the at least one fluorescent probe with regard to the macromolecule have been determined at a high precision for generating the three-dimensional map, for which many photons are needed from the at least one fluorescent probe. Thus, there is the danger that the respective fluorescent probe is permanently bleached photo-chemically or at least transferred into a dark state for a longer period of time, and has, thus, to be replaced by another fluorescent probe. The respective fluorescent probe comprises a fluorophore, i.e. a fluorescent part. In addition to that, the fluorescent probe may have further parts connected to the fluorescent part to adjust its properties in a desired way. Practical examples for this will be provided. A fluorophore, i.e. the fluorescent part of the fluorescent probe, has a typical diameter of about 1 to 2 nm. In determining the spatial position of the at least one fluorescent probe with regard to the macromolecule, the exact position of precisely this fluorophore or fluorescent part of the fluorescent probe is determined. The precision with a simple standard deviation no larger than 2 nm to be achieved in this process can be achieved by means of various high-resolution methods of the so-called localization in which fluorescence light photons emitted by the fluorescent probe are registered. These methods also include methods that are designated as PALM or STORM and in which the precision in determining the respective position of the singularized probe increases with the root of the number of fluorescence light photons registered. Exemplary methods of localization will be indicated further below.

In the method according to the present disclosure, not the space in which the fluorescent probe, but, to the contrary, the space in which the macromolecule is located and which is thus not accessible for the probe is registered with the aid of the at least one fluorescent probe. In other words, the spatial positions of the at least one fluorescent probe form a three-dimensional negative image omitting the macromolecule. The surface of this negative image, i.e. the bounding surface bounding the determined spatial positions of the fluorescent probe with regard to the macromolecule, essentially corresponds to the surface of interest of the macromolecule. The bounding surface is not exactly identical to the surface of interest but differs therefrom depending on the properties of the fluorescent probe. This will also be discussed in further detail below. The result of the method according to the present disclosure is the three-dimensional map of at least a part of the surface of the macromolecule which has been obtained in a very direct way as compared to the known methods of structural analysis, and which, thus, indicates the surface of the macromolecule very precisely. For example, pouches in the surface and other spatial structures which are connected with functionalities of the macromolecule, like, for example binding sites, are not only recognized but also exactly descripted by means of the method according to the present disclosure.

The spatial resolution of the map generated by the method according to the present disclosure depends on the surface density of the spatial positions of the fluorescent probe determined at the surface of the macromolecule. The higher the surface density the higher the spatial resolution. In an embodiment, so many spatial positions of the at least one fluorescent probe are determined that an average surface density of the spatial positions determined at the surface of the macromolecule is at least 25 positions per 100 square nanometers (10 nm×10 nm). In an embodiment, there are at least 50, or at least 100, or even at least 200 positions per 100 square nanometers surface. However, the method according to the present disclosure to a lesser extent aims for enhancing or for in any case achieving at least the spatial resolutions of known methods of structural analysis in determining the tertiary structure of a macromolecule but for obtaining additional information about the surface of the macromolecule, whose course is determined at a sufficiently high spatial resolution, which information allows for direct conclusions on possible bindings of other molecules and macromolecules to the macromolecule investigated.

In an embodiment, the bounding surface which bounds the determined spatial positions of the at least one fluorescent probe with regard to the macromolecule is not only determined as such, but a local surface density of the spatial positions along the bounding surface is also determined and entered in the three-dimensional map. If, generally, the density of the spatial positions outside the macromolecule is the same everywhere, the local surface density of the spatial positions at the bounding surface is an indication of an affinity of the fluorescent probe to a special area of the surface of the macromolecule. Thus, in addition to its spatial course, further information about the surface of the macromolecule is obtained. This information depends on the properties of the at least one fluorescent probe.

Most generally, it is advantageous to consider properties of the at least one fluorescent probe in generating the three-dimensional map. These properties to be considered are, for example, the dimensions of the at least one fluorescent probe which determine a spatial distance between the determined spatial positions and the actual surface of interest of the macromolecule. Furthermore, these properties include physical and/or chemical affinities of the at least one fluorescent probe to special areas of the surface. With the aid of these affinities, the position of the special areas of the surface can be registered.

Practically, in the method according to the present disclosure, binding affinities and/or binding constants for molecules with predetermined physical and/or chemical affinities can be derived from the determined spatial positions and the properties, for example, of fluorescent probes which have at least temporarily been movable with regard to the macromolecule in the medium, and entered in the three-dimensional map. The determination of such binding affinities and/or binding constants by means of the fluorescent probe is a considerable advantage of the method according to the present disclosure as compared to all methods of the structural analysis in which such binding affinities and/or binding constants have to be indirectly derived from the spatial and chemical structure of a macromolecule.

For the purposes explained above, the at least one fluorescent probe may purposefully be provided with an affinity group which is selected such that it has an exclusive or at least increased affinity to areas of interest at the surface of the macromolecule with special chemical and/or physical properties. Practically, these physical and/or chemical properties may be polarity, hydrophilicity, lipophilicity, binding strength for bonds by van der Waals forces or hydrogen bridges or electrostatic attraction and the like. It is to be understood that the complete surface of the macromolecule cannot be mapped only with at least one probe with a single affinity group which has an exclusive affinity to special areas of the surface of the molecule. Instead, for the complete mapping of the surface, either fluorescent probes with affinity groups which cover all areas of the surface of the molecule are to be used, or at least one probe has to be used which scans all areas of the surface of the macromolecule with its spatial positions.

It is to be understood that the spatial arrangement of the macromolecule, like, for example, the coordinates of the macromolecule, has to be known for determining the spatial positions of the at least one fluorescent probe with regard to the macromolecule. However, it is sufficient here that the respective spatial arrangement of the macromolecule in determining at least some of the spatial positions of the at least one fluorescent probe is the same. In this case, the low resolution negative images of the macromolecule each obtained for one spatial arrangement may be combined into a higher resolved negative image with the aid of computer algorithms as they are generally known from cryo-EM, for example. However, it is advantageous to know or to at least fix the spatial arrangement of the macromolecule during the step of determining all or at least as many as possible spatial positions of the at least one fluorescent probe. For this purpose, the spatial arrangement of the macromolecule may be predetermined by coupling the macromolecule in a fixed orientation to a fixed coupling site in the medium and/or fixed by means of the medium into which the macromolecule is embedded or will be embedded. Alternatively or additionally, the spatial arrangement may be determined by determining at least one spatial marker position of at least one position marker attached to the macromolecule. Such position markers may also be tracked to continuously monitor the spatial arrangement of the macromolecule. This may be suitable, if the macromolecule is movable within the medium.

In an embodiment, the step of determining the plurality of the spatial positions of the at least one fluorescent probe with regard to the macromolecule is implemented by localization according to any of the methods known as MinFlux or MinSTED. With these methods, the step of determining the spatial positions of the at least one fluorescent probe at the requested precision whose single standard deviation is no larger than 2 nm is possible on the basis of relatively few detected fluorescence light photons. In an embodiment, a precision with a single standard deviation of no more than 1 nm or even no more than 0.5 nm can be achieved. Thus, the surface of interest of the macromolecule may be mapped at a high spatial resolution. As already discussed, other high resolution methods of localization are in principle also applicable for determining the spatial positions of the at least one fluorescent probe based on the basis of the fluorescence light emitted by it.

All high-resolution methods of localization in which the spatial positions of the at least one fluorescent probe can be determined at the requested high precision require that the at least one fluorescent probe is singularized in determining its spatial position, i.e. that its fluorescence light photons can be separated from fluorescence light photons of other fluorescent probes, for example, due to a sufficient spatial distance of the fluorescent probes. This sufficient spatial distance may at least in the average be achieved in that the at least one fluorescent probe is introduced into the medium at a low spatial concentration only. However, just a lower spatial concentration of the probes in the medium which are actually fluorescent at any one time is relevant. Probes which are not in a fluorescent state at present are not relevant. Here, a fluorescent state of a probe is understood in that the probe in this state is excitable for emission of fluorescence light photons by fluorescence excitation light. On the other hand, here, the fluorescent state does not mean an electronic state of the probe, which has already been excited by fluorescence excitation light and upon the relaxation of which into the ground state of the probe, the probe emits a fluorescence light photon.

The spatial positions of the at least one fluorescent probe which are determined in the method according to the present disclosure may be reached by the at least one fluorescent probe by relative movements with regard to the macromolecule in the medium. The mobility of the fluorescent probe with regard to the macromolecule may completely or essentially be based on diffusion. In any case, a diffusion velocity of the at least one fluorescent probe in the medium may be adjusted by a composition and/or a temperature of the medium and/or by dimensions of the fluorescent probe. By means of the composition of the medium, its viscosity can be defined, which is often temperature-dependent. The temperature of the medium also influences the thermal excitation of the diffusion of the at least one fluorescent probe. Vice versa, via the viscosity of the medium, the dimensions of the fluorescent probe have an effect on its diffusion velocity. The diffusion velocity may also be influenced by a chemical or physical affinity of the fluorescent probe to the medium, like, for example, by the polarity or charge of the fluorescent probe. In practice, a glycerin-containing medium may be used as the embedding medium, the diffusion velocity being adjustable within a large range by the temperature and/or glycerin content and/or water content of the embedding medium. Similar effects can be achieved by means of thiodiethanol (TDE) which is known to those skilled in the art of both electron microscopy and fluorescence microscopy. In adjusting low temperatures, the formation of ice crystals in the medium can be avoided by means of TDE, even if the medium is the natural surroundings of the macromolecule in a biological cell. In the selection of the medium, its optical properties have also to be considered to not to introduce disturbing aberrations in directing the fluorescence excitation light into the medium and/or in registering the fluorescence light photons emitted out of the medium, as it is necessary for determining the spatial positions of the at least one fluorescent probe by localization. Such aberrations reduce the precision achievable in determining the spatial positions of the at least one fluorescent probe.

Relative movements of the at least one fluorescent probe with regard to the macromolecule may also be caused by an external excitation of the medium for vibrations and/or by a flow of the medium and/or by moving the macromolecule with regard to the medium and/or by an electric or magnetic field that exerts forces on the at least one fluorescent probe in the medium. It is recommended to vary the direction of the vibrations, the flow, the movements, or the electric or magnetic field, respectively, to map the surface of interest of the macromolecule in all spatial directions to a same extent. At least, the direction of flow of the medium or an electric or magnetic field should be reversed during determining the spatial positions of the at least one fluorescent probe.

As an alternative or in addition to a relative movement of the at least one fluorescent probe with respect to the macromolecule in the medium, the spatial positions of the at least one fluorescent probe which are determined in the method according to the present disclosure may be achieved by singularizing changing subsets of a total number of equal fluorescent probes included in the medium. With a sufficient concentration of the total number of the equal fluorescent probes, a sufficient number of spatial positions may even be achieved without any relative movement of the individual fluorescent probes with respect to the medium. The step of singularizing the fluorescent probes for determining their spatial positions such that the fluorescence light photons emitted by the respective singularized fluorescence probe can be registered separately, may be implemented in a generally known way by, for example, switching on and/or off switchable fluorescent probes. In this process, the switching on and/or off may, in principle, be implemented by any physical or chemical signal. In doing so, the switching on and/or off may occur stochastically from a temporal point of view, i.e. spontaneously, wherein the switching rates may be adjusted by chemical conditions such as pH, concentrations of special buffers and so on, which are known to those skilled in the art from the literature on single-molecule switching microscopy. Often, switching light is used for this purpose. Thus, the step of singularizing may also be implemented with activating photoactivatable fluorescent probes by activation light, wherein the activation light may have the same wavelength as or another wavelength than fluorescence excitation light which is afterwards used for exciting the fluorescent probes for emission of fluorescence light photons. Further, fluorogenic fluorescent probes may be used for singularizing the fluorescent probes. In this case, it may be preferred, if the bonds transferring the fluorogenic fluorescent probes into their fluorescent state are bonds to the surface of interest of the macromolecule. Then, the fluorogenic fluorescent probes are in their fluorescent state selectively at the surface of the macromolecule, and no or at least less spatial positions of the fluorescent probe, which do not contain information on the surface of actual interest of the macromolecule, are determined in the volume of the medium.

Even on principle, the step of determining the spatial positions of the at least one fluorescent probe may be concentrated to the expected surface of the macromolecule. For this purpose, the course of the surface may be estimated from the spatial positions of the at least one fluorescent probe determined at first, and this estimation may be enhanced with each further determined spatial position of the at least one fluorescent probe. Alternatively or additionally, one may start from the coordinates of a center point of the macromolecule determined in another way, and search, in all spatial directions, at increasing distances to this center point for spatial positions of the fluorescent probe. In this way, at most only few spatial positions of the fluorescent probe are determined in the volume of the medium, which do not include information on the surface of interest of the macromolecule.

As already indicated, different fluorescent probes with different affinities to different areas of the surface of the macromolecule may be introduced in the medium, wherein the plurality of the spatial positions of the different singularized fluorescent probes are determined separately. In doing so, the separation may be implemented by different wavelengths of the fluorescence excitation light or the fluorescence light, or also temporally in that the different fluorescent probes are introduced in the medium one after the other. The bounding surface bounding the spatial positions may also be determined separately for the different fluorescent probes in order to be able to consider the different properties of the probes, for example, with regard to possible differences between bounding surface and surface of interest.

The method for mapping the surface of the macromolecule may be parallelized. This means that several copies of the macromolecule may be used and may, in parallel to each other, each be scanned with the aid of at least one fluorescent probe. The information obtained for each copy of the macromolecule in doing so, is summarized into an overall information about the surface of interest of the macromolecule. Practically, several copies of the macromolecule may each be embedded in the medium together with at least one fluorescent probe, wherein the medium may be a continuous over all copies of the macromolecule. Then, with regard to each of the plurality of copies of the macromolecule, a plurality of spatial positions of the respective at least one singularized fluorescent probe may be determined, and the bounding surface can be determined such that it bounds the determined spatial positions of all singularized fluorescent probes with regard to all copies of the macromolecule. It is to be understood that it is a basic condition for parallelizing the method according to the present disclosure that the coordinates of each of the individual copies of the macromolecule are not only temporarily constant but also known for all copies in order to be able to summarize the information about the surface of the macromolecule obtained with the individual copies. This may be done with the aid of computer programs as they are known from the structural analysis by means of cryo-EM.

In practice, the individual copies of the macromolecule may be coupled to coupling sites which are arranged in a fixed raster. Then, the spatial positions of the singularized fluorescent probes may be determined with regard to the respective copy by means of MinFlux or MinSTED, wherein the local minima or zero points of the light intensity distributions which is used for determining the spatial positions may be arranged in the same raster and may be shifted together with regard to the copies of the macromolecule.

Already present structural information related to the macromolecule may be considered in generating the three-dimensional map of at least a part of the surface of the macromolecule from the bounding surface. This structural information may, for example, be obtained from X-ray structural analysis, NMR, cryo-EM or prediction by means of artificial intelligence.

The method according to the present disclosure may also be executed repeatedly to monitor variations of the surface of interest of the macromolecule, particularly after a change of structure has been caused in the macromolecule by changing physical and/or chemical surrounding conditions, and/or a further macromolecule has been attached to the macromolecule, and/or a complex including the macromolecule has at least partially been dissolved.

In the method according to the present disclosure, all established fluorophores may be used as fluorescent probes or fluorophores of such fluorescent probes, particularly those which have a small transition probability into their triplet state or other dark states so that their spatial positions can be tracked over a longer period of time. Practical examples of suitable fluorophores are Atto647N and Abberior Star 635.

By means of coupling the copies of the macromolecule to the coupling sites in a known spatial arrangement, the spatial arrangements of the copies may be defined at a few nanometers. Thus, with a typical size of the macromolecules of a few to some 10 nm, the zero point of the light intensity distribution may, from the beginning, be shifted within a very small area, whose spatial arrangement is defined by the respective coupling site, for determining the spatial positions of the fluorescent probe at the surface of interest of the copies of the macromolecule. The raster of the zero points of the light intensity distributions may be provided by a so-called donut array, or by standing waves or crossed standing waves. Practically, two objectives facing each other in a so-called 4Pi-arrangement may be used. Standing waves in z-direction may be generated by using a substrate with a mirror surface. As known in principle, standing waves may also be arranged three-dimensionally, like in a stack of wood. The zero point may be three-dimensionally delimited by higher intensities of the light intensity distribution. The detection of the fluorescence light from the fluorescent probe may be implemented confocally or with the aid of a confocal detector array. Alternatively, the fluorescence light may be registered with a camera. The fluorescence light may be registered polarization-selectively or -sensitively to register spatial orientations of the fluorescent probe at the surface of interest of the macromolecule. For a better suppression of a background, the use of a temporarily resolving fluorescence detection which is known as time-gating may be advantageous. In mapping its surface, the macromolecule may be deformed, even by means of a direct application of force, to make special areas of its surface accessible to the fluorescent probe.

Now referring in greater detail to the drawings, FIG. 1, In a schematic depiction, shows a macromolecule 1 which, for example, is a protein and which is embedded in a medium 2. For example, the medium 2 may be a medium which forms the natural surroundings of the macromolecule 1 within in a biological cell. The medium 2 may be modified with regard to these natural surroundings. Alternatively, the medium 2 may be a special medium to be able to execute the steps for mapping a surface 3 of the macromolecule 1 descripted in the following in an effective way. Fluorescent probes 4 are introduced in the medium 2. Spatial positions of the fluorescent probes 4 with regard to the macromolecule 1 are determined by localization, i.e. by registering fluorescence light photons which are emitted by the fluorescent probes 4 at such a high precision that a single standard deviation is no larger than 2 nm, or no larger than 1 nm, or even no larger than 0.5 nm. For this localization, the respective fluorescent probe 4 hast to be singularized at its respective spatial position such that the fluorescence light photons emitted by it can be registered separately, i.e. separated from fluorescence light photons from other fluorescent probes 4, for its respective spatial position. This may be realized in that the fluorescent probes 4 are introduced in the medium 2 at a very small spatial concentration only, wherein the different spatial positions 4 are reached by the fluorescent probes 4 by relative movements of the fluorescent probes 4 with regard to the macromolecule 1. Alternatively or additionally, the fluorescent probes 4 may be singularized in that, at any one time, only a subset is transferred into an actually fluorescent state or left in the actually fluorescent state, and in that the respective subset has a low spatial concentration only. Then, a plurality of spatial positions of the fluorescent probes 4 can be determined without a need of the fluorescent probes 4 moving with regard to the macromolecule 1. In any case, a three-dimensional negative image of the macromolecule 1, from which the course of the surface 3 can be deduced, results from the plurality of the spatial positions of the fluorescent probes 4. Even if FIG. 1 only is a two-dimensional depiction and only shows the fluorescent probes if they are in a layer of the medium 2 which runs perpendicular to the viewing direction of FIG. 1, the spatial positions of the fluorescent probe 4 are determined in all three dimensions in order to determine the course of the surface 3 of the macromolecule 1 in all three dimensions.

Figure 2:
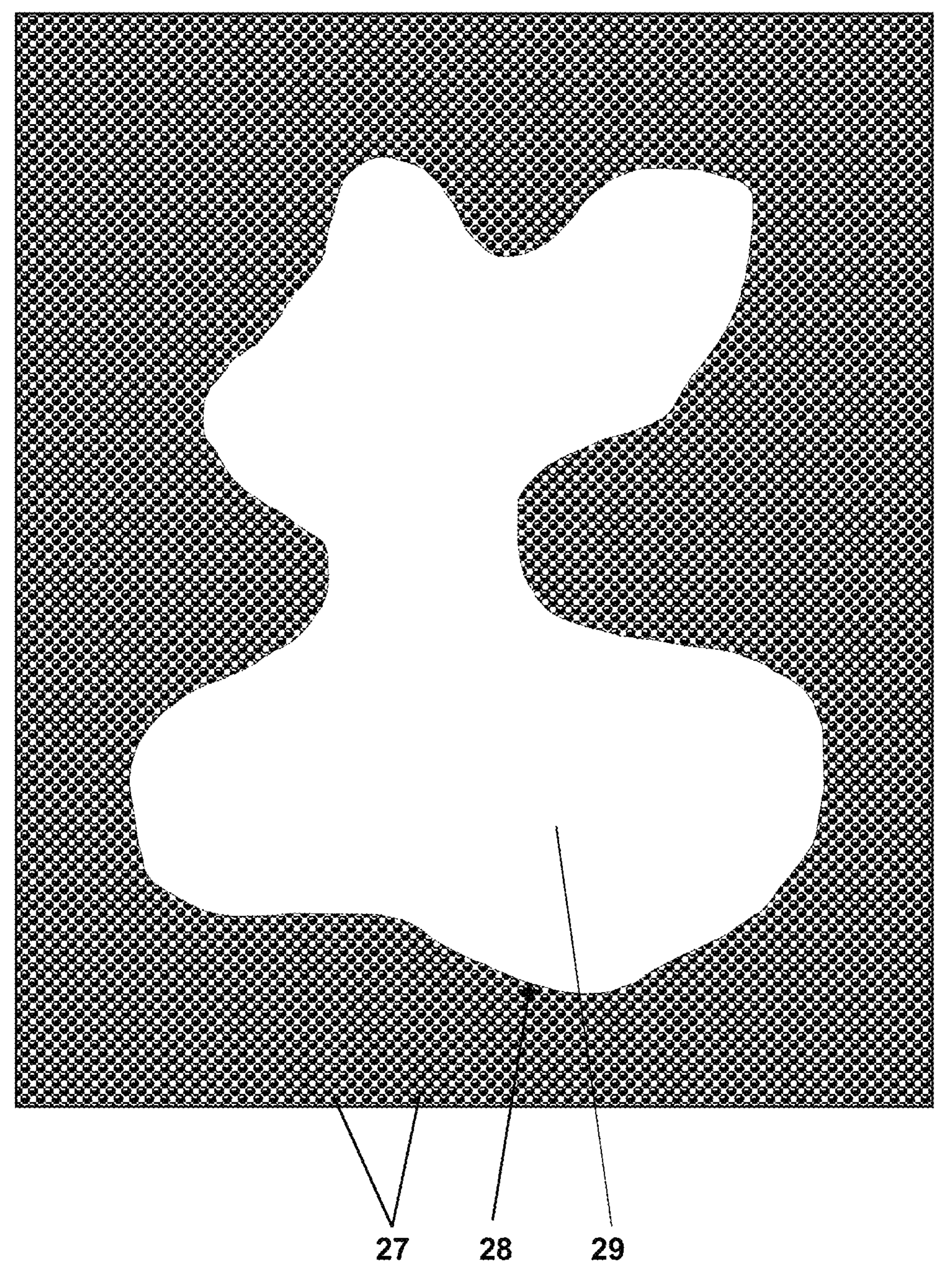
FIG. 2 schematically shows a negative image of the first macromolecule developing from a plurality of spatial positions of the fluorescent probes determined by localization.

The negative image 27 depicted in FIG. 2, in which the spatial positions 28 of the fluorescent probes 4 determined by localization leave out a space 29 filled by the macromolecule 1, also only takes account of a layer of the medium 2 perpendicular to the viewing direction of FIG. 1. The depiction of FIG. 2 is particularly schematic in so far as the spatial positions 28 of the fluorescent probes 4 determined by localization are, for reasons of simplicity, depicted in a regular arrangement and not in their actual and, without affinities of the fluorescent probes 4 to the macromolecule 1, generally stochastic arrangement.

Figure 3:
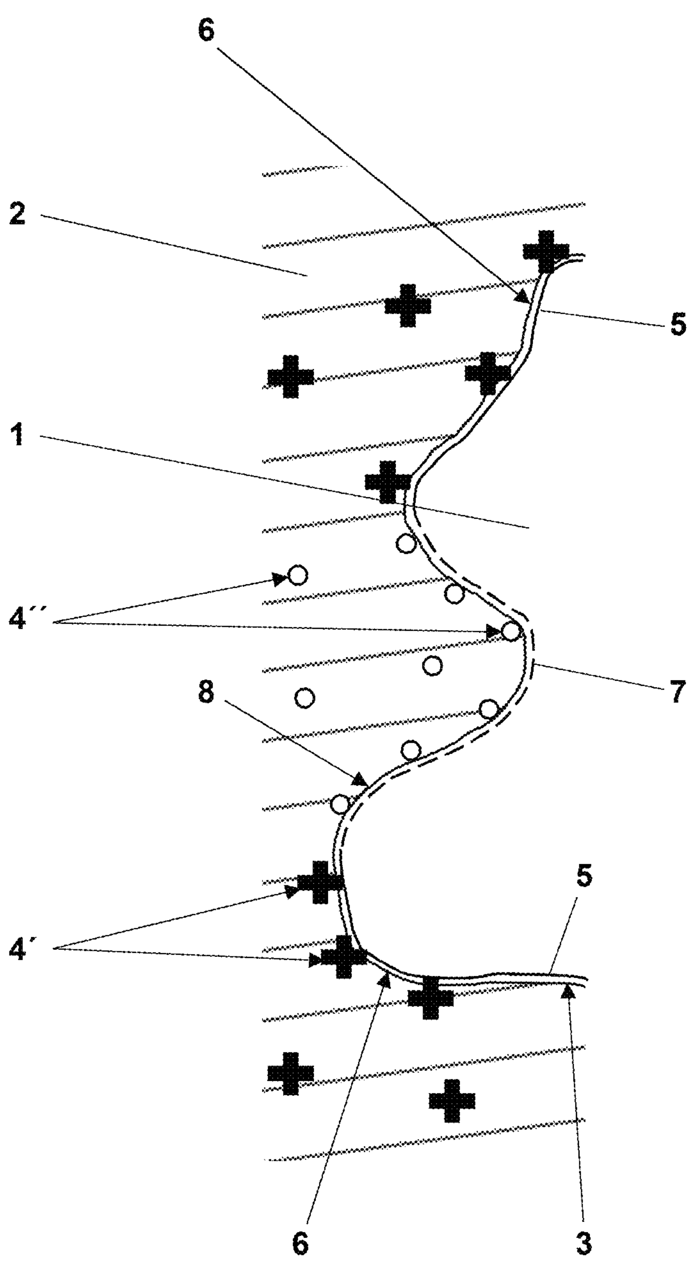
FIG. 3 shows different areas of a second macromolecule embedded in a medium with different fluorescent probes introduced in the medium, which have different affinities to different areas of a surface of the macromolecule.

FIG. 3 schematically depicts two different fluorescent probes 4' and 4" with crosses and circles. The different probes 4' and 4" comprise different affinities for different areas of the surface 3 of the macromolecule 1 embedded in the medium 2. In FIG. 3, for example, non-polar areas 6 of the surface 3, to which the fluorescent probes 4' have an increased affinity, are indicated with an additional continuous line 5. On the other hand, for example, a polar region 8, to which the fluorescent probes 4" have an increased affinity, is indicated with an additional dashed line 7. In that the spatial positions of the different fluorescent probes 4' and 4" are determined separately, the different areas 6 and 8 can be differentiated in determining the course of the surface 3.

Figure 4:
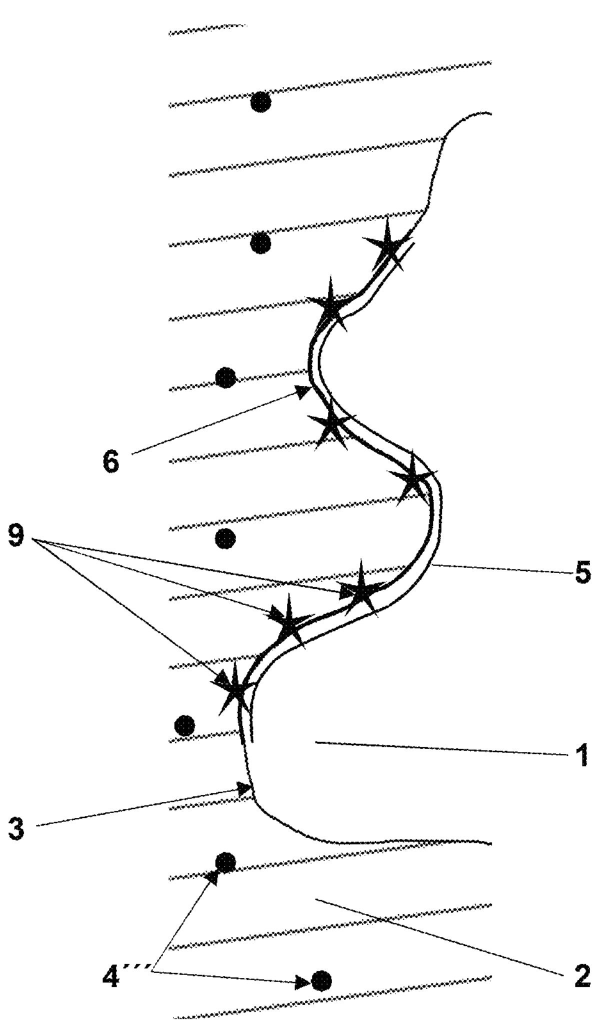
FIG. 4 shows an area of a surface of a third macromolecule embedded in a medium, wherein probes introduced in the medium get into a fluorescent state upon binding to this area of the surface.

FIG. 4 illustrates the case that fluorogenic fluorescent probes 4" in the medium 2 only get into their fluorescent state 9 and, correspondingly, their spatial position can only be determined, if they couple to a special area 6 of the surface 3. In this way, only spatial positions of the fluorescent probes 4" are determined which include information with regard the course of the surface 3, on the one hand, and the area 6 of the surface 3 to which the fluorogenic fluorescent probes 4" couple is specifically registered, on the other hand.

Figure 5:
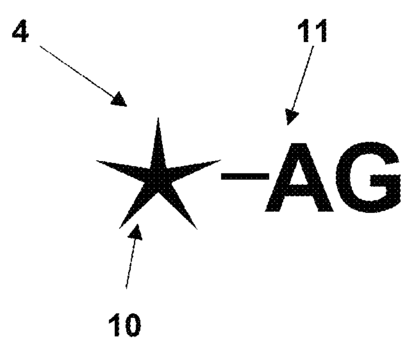
FIG. 5 schematically shows the design of a fluorescent probe made of a fluorophore and an affinity group.

FIG. 5 schematically shows the design of a fluorescent probe 4 made of a fluorophore 10 and an activity and/or affinity group 11. The activity and/or affinity group 11 may define the affinity of the fluorescent probe 4 to special areas 6, 8 of the surface 3 of the macromolecule 1, or impart fluorogenic properties to the fluorescent probe 4, or make the fluorescent probe 4 photoactivatable, on-switchable or off-switchable, or increase the dimensions of the fluorescent probe 4 to reduce its diffusion velocity within the medium 2, or the like.

Figure 6:
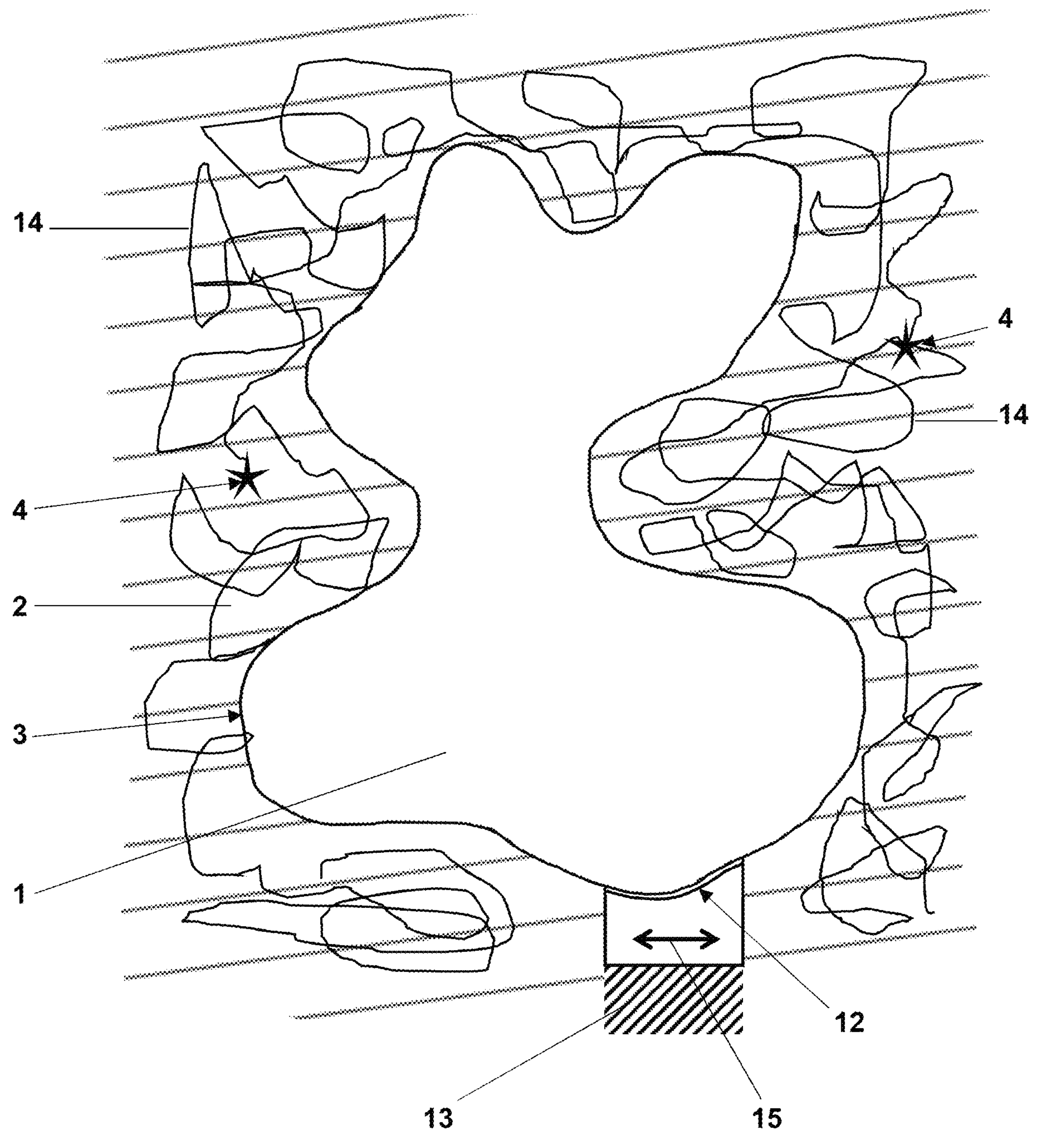
FIG. 6 shows a fourth macromolecule embedded in a medium, wherein a spatial arrangement of the macromolecule is defined by a coupling the macromolecule to a coupling site.

FIG. 6 illustrates that the macromolecule 1 in the medium 2 is coupled to a coupling site 12. For this reason, the macromolecule 1 has a defined position and spatial orientation in the medium 2 with regard to a basis 13 and thus with regard to external reference points. The spatial positions of the fluorescent probes 4 determined with regard to the basis or the external reference points may thus be transformed into spatial positions with regard to the macromolecule 1. Further, it is indicated in FIG. 6 that just a few fluorescent probes 4 are introduced in the medium 2, which, due to diffusion in the medium 2, move along undirected diffusion paths 14. In this way, the fluorescent probes 4 reach different spatial positions with regards to the macromolecule 1, which can be determined to register the course of the surface 3 of the macromolecule 1. Further, by means of a double arrow 15, it is indicated in FIG. 6 that the macromolecule 1, via its coupling site 12, for example, can be moved with regard to the medium 2, for example vibrated, to provoke additional relative movements between the fluorescent probes 4 and the macromolecule 1. However, care must be taken so that forced movements of the macromolecule 1 with regard to the medium 2 do not result in in-motion unsharpnesses in determining the spatial positions of the fluorescent probes 4 with regard to the macromolecule 1.

Figure 7:
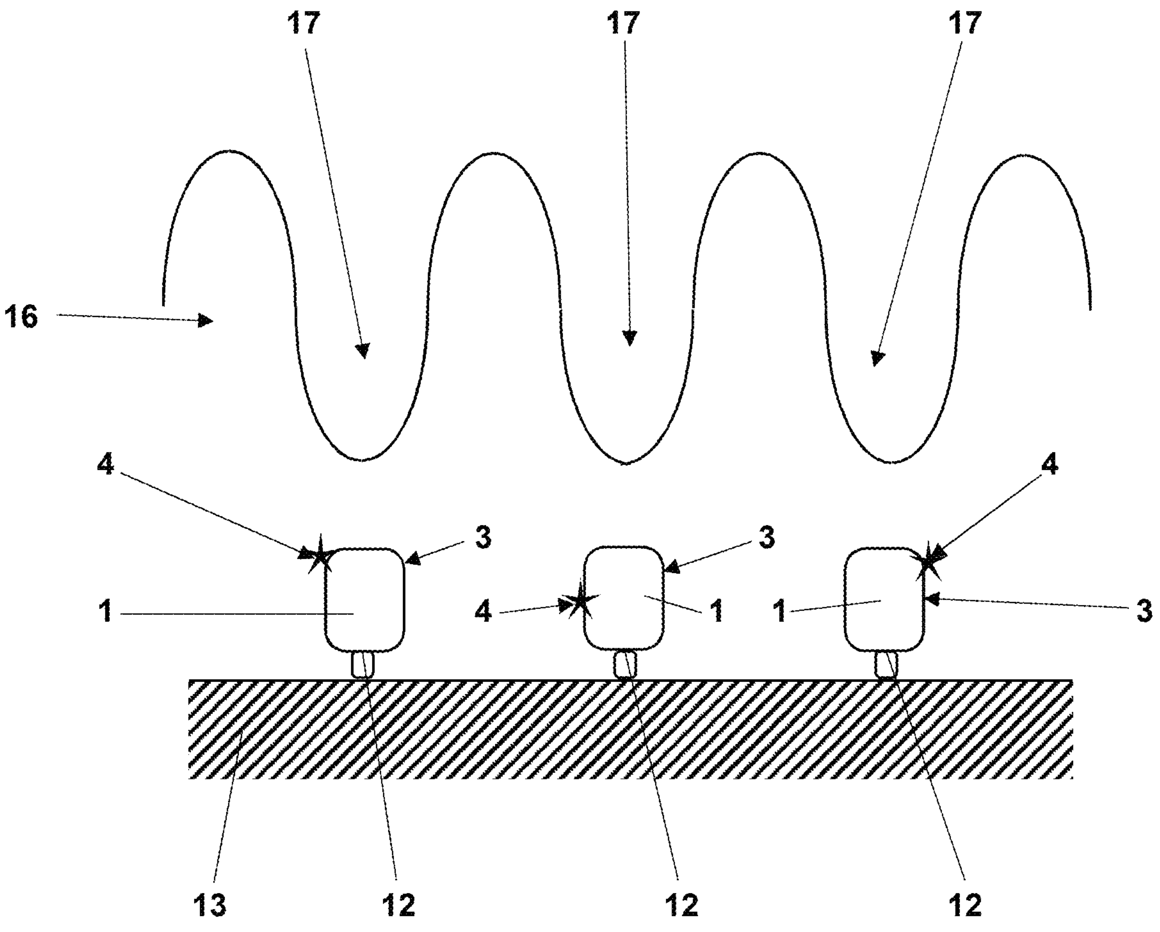
FIG. 7 shows several copies of a fifth macromolecule which are coupled to coupling sites in a fixed spacing, and a light intensity distribution with an arrangement of local intensity minima in the same fixed spacing.

It is schematically depicted in FIG. 7 that several copies of the macromolecule 1, by coupling to coupling sites 12 arranged in a fixed raster, are vice versa arranged in a fixed raster with regard to a basis 13 and are aligned with regard to their spatial arrangements. At the same time, (very schematically) a light intensity distribution 16 over the arrangement of the coupling sites 12 is indicated, which has local minima or zero points 17 spaced in the same raster. If the step of determining the spatial positions of the fluorescent probes 4 is, for example, implemented by the method known as MinFlux, the zero points 17 of the light intensity distribution 16 are those of fluorescence excitation light. In a localization of the fluorescent probes 4 by the method known as MinSTED, the zero points 17 are those of fluorescence inhibition or STED light which is directed onto the copies of the macromolecule 1 together with fluorescence excitation light. In any case, the light intensity distribution 16 may, as a whole, be shifted with regard to the totality of coupling sites 12 and the copies of macromolecule 1 coupled thereto to determine spatial positions of fluorescent probes 4 with regard to each of the copies of the macromolecule 1 in a parallel way.

Figure 8:
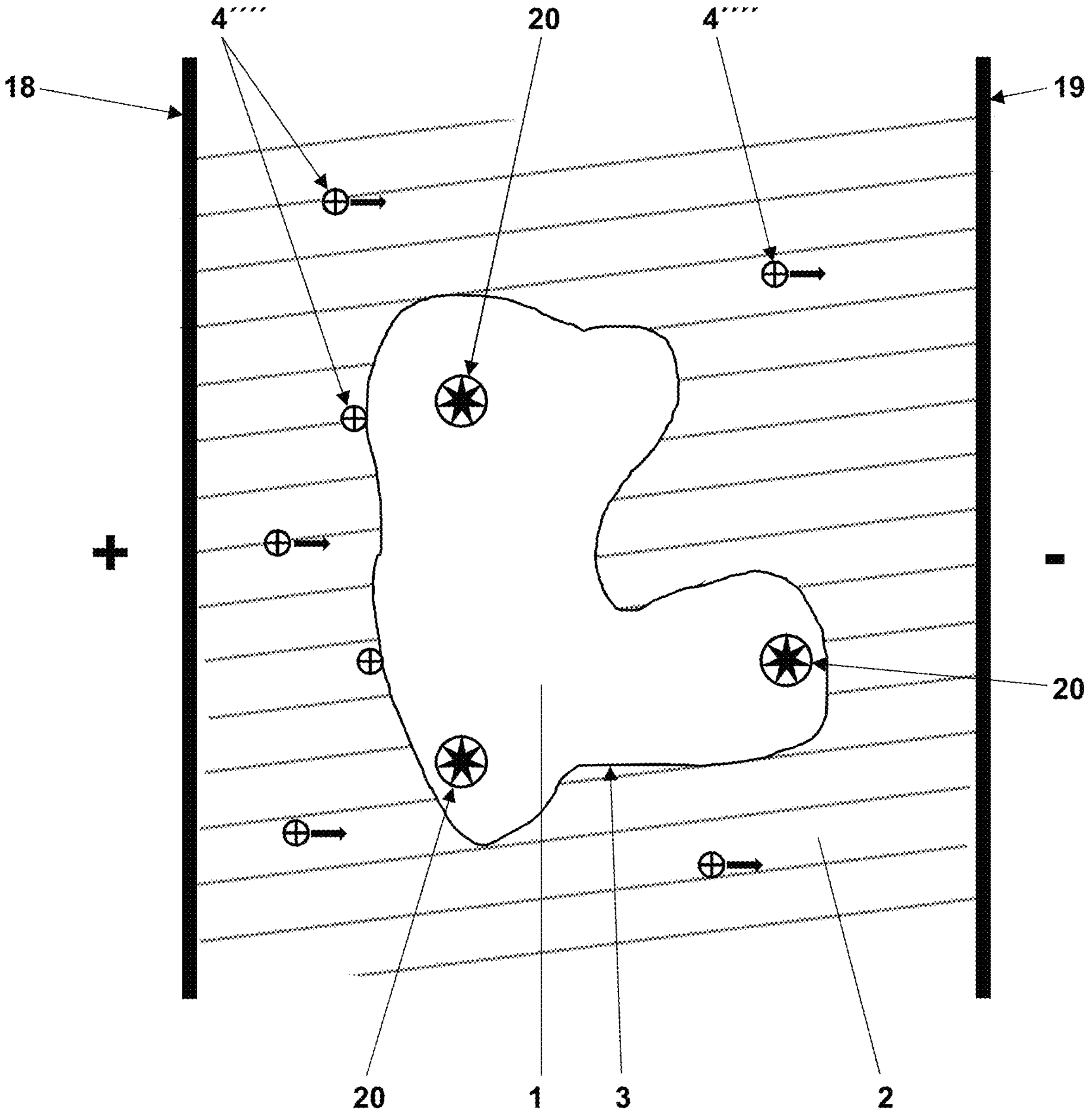
FIG. 8 illustrates the application of an electric field to move fluorescent probes relative to a sixth macromolecule embedded in a medium.

FIG. 8 illustrates how fluorescent probes 4" with a net charge are moved with regard to the macromolecule 1 embedded in the medium 2 by an electric field between an external anode 18 and an external cathode 19. Because the fluorescent probes 4" do not reach spatial positions at a back side of the macromolecule 1 facing away from their moving directions, it is suitable to vary the direction of the electric field, at least to reverse it once. Further it is indicated in FIG. 8 that position markers 20 are attached to the macromolecule 1. By determining the spatial positions of these at least three position markers 20 not arranged on a straight line, the coordinates of the macromolecule 1 can be determined and also be tracked if the macromolecule 1 can move within the medium 2. A spatial arrangement of the macromolecule 1 which remains constant at least over the determination of some spatial positions of the fluorescent probes 4" or which is known is a precondition for that the spatial positions of the fluorescent probes 4" can be determined with regard to the macromolecule 1.

Figure 9:
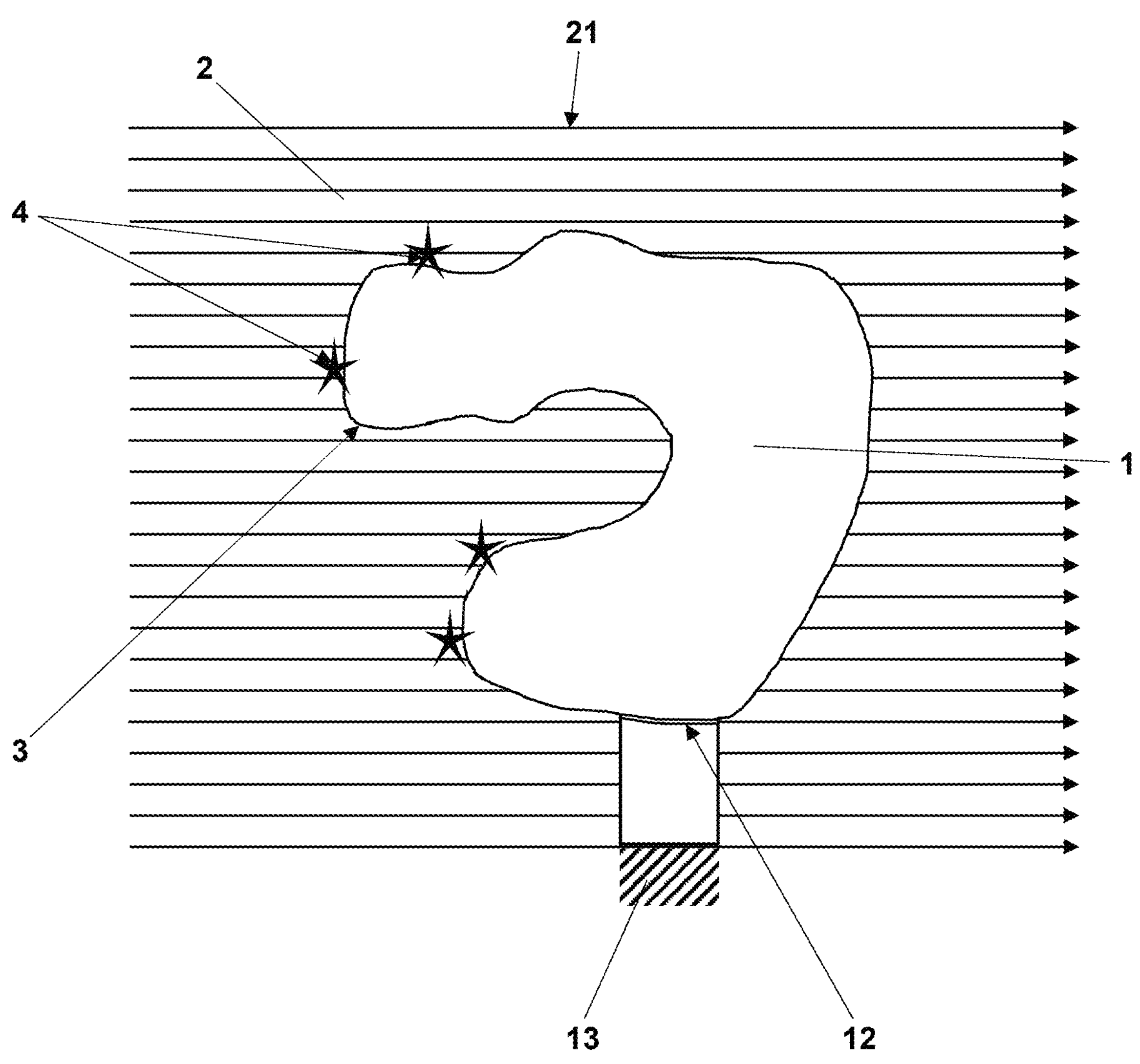
FIG. 9 illustrates a flow of a medium around a seventh macromolecule arranged in a spatially fixed way.

It is indicated in FIG. 9 that the macromolecule 1 is arranged in a flow 21 of the medium 2 with the fluorescent probes 4 introduced therein, wherein the macromolecule 1 is fixed with regard to a basis 13 by coupling to a coupling site 12. Even with the relative movement of the fluorescent probes 4 with regard to the macromolecule 1 resulting therefrom, the fluorescent probes 4 do not reach spatial positions at the back side of the macromolecule 1 facing away from their moving direction, and a variation of the direction of the flow 21 with regard to the macromolecule 1, at least one reversion of the direction of the flow 21, is suitable.

Figure 10:
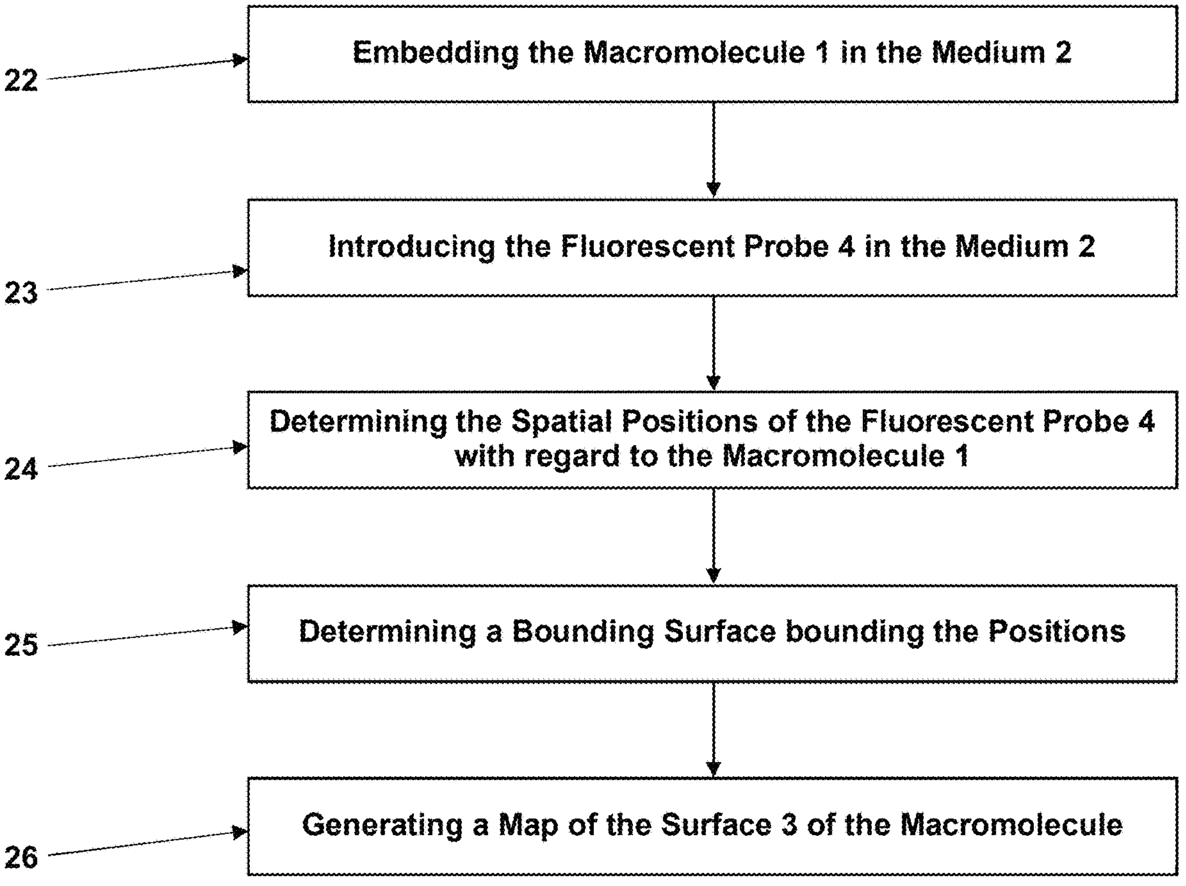
FIG. 10 is a block diagram of an embodiment of the method according to the present disclosure for mapping the surface of a macromolecule.

FIG. 10 is a block diagram of a method according to the present disclosure for mapping the surface 3 of the macromolecule 1. A step of embedding 22 the macromolecule 1 in the medium 2 is optional in so far as the natural surroundings of the macromolecule 1, for example, in a biological cell, can be used as the medium 2. A step of introducing 23 the fluorescent probe 4 in the medium 2 follows. Alternatively, the fluorescent probes 4 may have already been introduced in the medium 2 when the macromolecule is embedded in the medium 2. In a step of determining 24 spatial positions of the fluorescent probes 4 with regard to the macromolecule 1, it can be differentiated between different fluorescent probes 4 with different chemical and physical properties and different affinities to different areas 6 and 8 of the surface 3 of the macromolecule 1 resulting therefrom. A step of determining 25 a bounding surface bounding the determined spatial positions with regard to the macromolecule follows. This bounding surface already essentially corresponds to the surface 3 of interest of the macromolecule 1. However, in a step of generating 6 a three-dimensional map of the spatial course of the surface 3, properties of the fluorescent probes 4 are considered. This relates to the dimensions of the fluorescent probes 4 which result in an offset between the spatial positions determined for them to the surface 3 of interest, even if the fluorescent probes 4 directly bind to the surface 3. Further, different affinities of the fluorescent probes 4 used are considered to enter different areas 6 and 8 of the surface 3 of the macromolecule 1 with different physical and/or chemical properties into the map. In the step of generating 26 the map of the surface 3, structural information available for the macromolecule 1 from other sources can be considered, like, for example, structural information which has been obtained by X-ray structural analysis, NMR, cryo-EM or by means of artificial intelligence from a structural formula or primary structure. For example, the macromolecule 1 is a protein or a protein complex. Thus, the map of the surface 3 generated includes essential information with regard to the tertiary structure of the respective protein or the quaternary structure of the respective protein complex.

Figure 11:
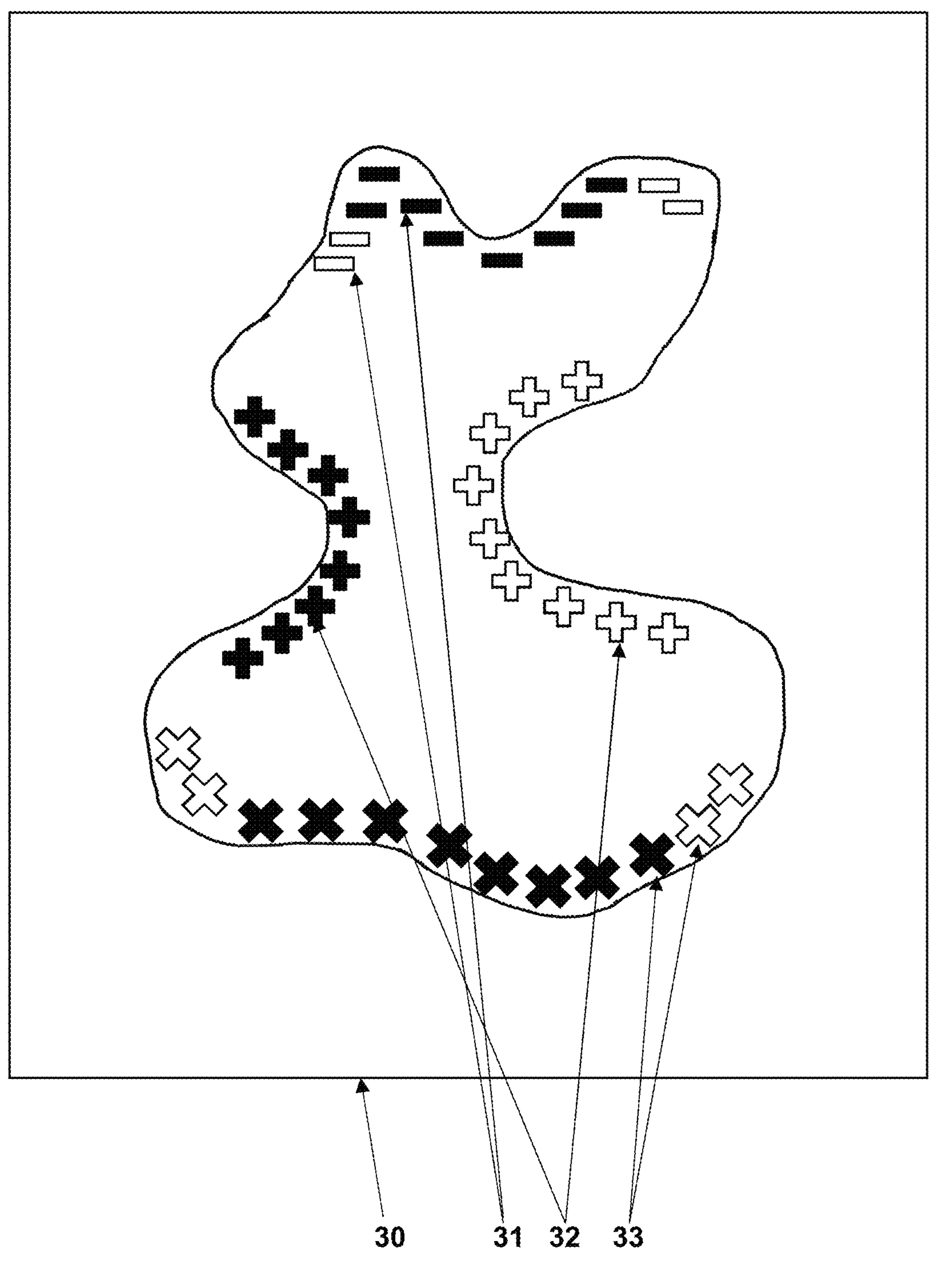
FIG. 11 is a schematic map of the first macromolecule according to FIG. 1 obtained as a result of the method according to the present disclosure.

FIG. 11 shows a simplified example of the map 30 of the macromolecule 1 according to FIG. 1, which is obtained as the result of the method according to the present disclosure. Despite the once again two-dimensional depiction in FIG. 11, the obtained map is in fact three-dimensional. In FIG. 11, different areas of a depicted course 34 of the surface 3, in which the macromolecule comprises different physical and/or chemical properties at its surface, are marked with different symbols 31 to 33. A lower specificity of these properties is indicated by unfilled symbols 31 to 33 and a stronger specificity of these properties is indicated by filled symbols 31 to 33. The specificity of the physical and/or chemical properties may even be stronger differentiated in the map 30 by, for example, indicating absolute or relative binding constants which can be determined in the method according to the present disclosure by temporarily tracking probes 4 which are movable in the medium 2 and which have themselves defined physical and/or chemical properties. Together with the spatial course 34, the physical and/or chemical properties which particularly include polarity, hydrophilicity and lipophilicity but also binding strengths for bonds by van der Waals forces, hydrogen bridges, electrostatic attraction and the like, determine the ability or tendency of the macromolecule 1 to enter into bonds with other molecules or macromolecules in individual areas of its surface 3.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method for mapping the surface of a macromolecule, the method comprising the steps of:
 introducing at least one fluorescent probe into a medium in which the macromolecule is embedded or will be embedded;
 determining a plurality of spatial positions of the at least one fluorescent probe with regard to the macromolecule by localization of the at least one singularized fluorescent probe at a single standard deviation of not more than 2 nm, wherein fluorescence light photons emitted by the singularized fluorescent probe are registered;
 determining a bounding surface bounding the determined spatial positions with regard to the macromolecule; and
 generating a three-dimensional map of at least a part of the surface of the macromolecule from the bounding surface.

2. The method of claim 1, wherein, in the step of determining a plurality of spatial positions of the at least one fluorescent probe, so many spatial positions of the at least one fluorescent probe are determined that an average surface density of the spatial positions determined at the surface of the macromolecule is at least 25 positions per 100 square nanometers.

3. The method of claim 1, wherein, in the step of determining a plurality of spatial positions of the at least one fluorescent probe, the plurality of spatial positions of the at least one fluorescent probe with regard to the macromolecule are determined by localization of the at least one singularized fluorescent probe at a single standard deviation of not more than 1 nm, and so many spatial positions of the at least one fluorescent probe are determined that an average surface density of the spatial positions determined at the surface of the macromolecule is at least 100 positions per 100 square nanometers.

4. The method of claim 1, further comprising:

registering a local surface density of the determined spatial positions along the bounding surface; and entering the registered local surface density into the three-dimensional map.

5. The method of claim 1, wherein, in the step of generating the three-dimensional map, properties of the at least one fluorescent probe are considered, which are selected from a group including dimensions of the at least one fluorescent probe and physical or chemical affinities of the at least of one fluorescent probe to special areas of the surface.

6. The method of claim 5, wherein, in the step of generating the three-dimensional map, at least one of binding affinities and binding constants for molecules with predetermined physical or chemical affinities are derived from the determined spatial positions and the properties of the at least one fluorescent probe, and entered into the three-dimensional map.

7. The method of claim 1, further comprising:

providing the at least one fluorescent probe with an affinity group which is selected such that the at least one fluorescent probe has an increased or inclusive affinity for special areas of the surface of the macromolecule with special chemical and/or physical properties.

8. The method of claim 1, wherein a spatial arrangement of the macromolecule is at least one of:

predetermined by coupling the macromolecule in a fixed orientation to a fixed coupling site in the medium;

fixed by means of the medium in which the macromolecule is embedded; or determined by determining at least one spatial marker position of at least one position marker attached to the macromolecule.

9. The method of claim 1, wherein, in the step of determining the plurality of the spatial positions by localization, the plurality of the spatial positions of the at least one singularized fluorescent probe with regard to the macromolecule is determined by means of MinFlux or MinSTED.

10. The method of claim 1, further comprising:

singularizing the at least one fluorescent probe by adjusting a low spatial concentration of the at least one fluorescent probe in the medium.

11. The method of claim 1, wherein the spatial positions of the at least one fluorescent probe are reached within the medium by relative movements of the at least one fluorescent probe with regard to the macromolecule.

12. The method of claim 11, wherein a diffusion velocity of the at least one fluorescent probe within the medium is adjusted by means of at least one of:

a composition and a temperature of the medium; or dimensions, and chemical or physical properties of the fluorescent probe.

13. The method of claim 11, wherein the relative movements are elicited by at least one of:

an external excitation of the medium for vibrations;

a flow of the medium;

movements of the macromolecule with regard to the medium; or an electric or magnetic field.

14. The method of claim 1, wherein the spatial positions of the at least one fluorescent probe are achieved by means of singularizing alternating subsets of a total number of equal fluorescent probes included in the medium.

15. The method of claim 14, wherein the alternating subsets are singularized by means of at least one of:

switching on and switching off the fluorescent probes selected from switchable fluorescent probes;

activating the fluorescent probes selected from photoactivatable fluorescent probes; or selecting the fluorescent probes from fluorogenic fluorescent probes.

16. The method of claim 1, wherein, in the step of introducing, different fluorescent probes with different affinities to different areas of the surface of the macromolecule are introduced in the medium, wherein the step of determining the plurality of the spatial positions is separately implemented for the different fluorescent probes.

17. The method of claim 16, wherein the step of determining the bounding surface bounding the spatial positions is separately implemented for the different fluorescent probes.

18. The method of claim 1, comprising:

embedding several copies of the macromolecule, each together with at least one fluorescent probe, in the medium;

in the step of determining the plurality of spatial positions, determining a plurality of spatial positions of the respective at least one singularized fluorescent probe with regard to each of the several copies of the macromolecule, and in the step of determining the bounding surface, determining the bounding surface such that it bounds the determined spatial positions of all singularized fluorescent probes with regard to all copies of the macromolecule.

19. The method of claim 1, wherein, in the step of generating the three-dimensional map of at least a part of the surface of the macromolecule from the bounding surface, considering already present structural information on the macromolecule.

20. The method of claim 1, wherein the step of determining the spatial positions of the at least one fluorescent probe with regard to the macromolecule and the step of determining the bounding surface bounding the spatial positions with regard to the macromolecule are repeated after at least one of:

a structural change in the macromolecule has been caused by a change of physical or chemical surrounding conditions;

a further macromolecule has been attached to the macromolecule; or a molecule complex including the macromolecule has at least partially been dissolved.

* * * * *